(12) United States Patent
Soltic et al.

(10) Patent No.: US 12,305,544 B2
(45) Date of Patent: May 20, 2025

(54) HYDRAULIC DRIVE FOR ACCELERATING AND BRAKING COMPONENTS

(71) Applicants: EMPA Eidgenössische Materialprüfungs-und Forschungsanstalt, Dubendorf (CH); Wolfgang Schneider Ingenieurburo, Thun (CH)

(72) Inventors: Patrik Soltic, Uhwiesen (CH); Andyn Omanovic, Uster (CH); Wolfgang Schneider, Thun (CH)

(73) Assignees: EMPA Eidgenössische Materialprüfungs-und Forschungsanstalt, Dubendorf (CH); Wolfgang Schneider Ingenieurburo, Thun (CH)

( * ) Notice: Subject to any disclaimer, the term of this patent is extended or adjusted under 35 U.S.C. 154(b) by 0 days.

(21) Appl. No.: 18/268,876

(22) PCT Filed: Dec. 20, 2019

(86) PCT No.: PCT/EP2019/086856
§ 371 (c)(1),
(2) Date: Jun. 21, 2023

(87) PCT Pub. No.: WO2021/121639
PCT Pub. Date: Jun. 24, 2021

(65) Prior Publication Data
US 2024/0035400 A1 Feb. 1, 2024

(51) Int. Cl.
*F01L 9/10* (2021.01)
*F01L 9/40* (2021.01)

(52) U.S. Cl.
CPC .. *F01L 9/10* (2021.01); *F01L 9/40* (2021.01)

(58) Field of Classification Search
CPC ........ F01L 9/10; F01L 9/40; F01L 2009/4086
(Continued)

(56) References Cited

U.S. PATENT DOCUMENTS

| 5,456,222 A | 10/1995 | Schechter |
| 7,086,358 B2 | 8/2006 | Panciroli |

(Continued)

FOREIGN PATENT DOCUMENTS

| CN | 102278161 B | 7/2013 |
| DE | 1940177 A | 2/1970 |

(Continued)

OTHER PUBLICATIONS

International Search Report in related PCT/EP2019/086856.
Written Opinion of the International Search Authority in related PCT/EP2019/086856.

*Primary Examiner* — Jorge L Leon, Jr.
(74) *Attorney, Agent, or Firm* — Paul D. Bianco; Fleit Intellectual Property Law (57) ABSTRACT

In order to provide a more reliable configuration for a hydraulic drive for accelerating and braking in particular a gas exchange valve (20) of internal combustion engines or other reciprocating engines, in particular if the occurring maximum travel of the moving mass can deviate considerably from an expected setpoint position, it is proposed that the drive piston (23) has at least one control edge (31) corresponding to an inflow opening (33), which, when a defined travel $h_{ab}$ has been attained, prevents the inflow of drive pressure $p_1$ into the drive chamber (27) and/or prevents the low-loss outflow of pressure medium from the brake chamber (29) to the basic pressure level (40), wherein the remaining hydraulic drive force vanishes, becomes small or changes its sign when said travel $h_{ab}$ is attained.

19 Claims, 7 Drawing Sheets

(58) Field of Classification Search
USPC .................................................. 123/90.12
See application file for complete search history.

(56) References Cited

U.S. PATENT DOCUMENTS

| | | | | |
|---|---|---|---|---|
| 2004/0144345 A1* | 7/2004 | Diehl | ................ | F01L 9/10 |
| | | | | 123/90.12 |
| 2022/0042428 A1* | 2/2022 | Schneider | ........... | F01L 13/0015 |

FOREIGN PATENT DOCUMENTS

| | | | | |
|---|---|---|---|---|
| DE | 10024268 A1 | 11/2001 | | |
| DE | 10 2004 022 A1 | 1/2005 | | |
| DE | 102004022447 A1 | 1/2005 | | |
| EP | 0520633 A2 | 12/1992 | | |
| EP | 1967706 A2 * | 9/2008 | ................ | F01L 9/02 |
| EP | 1967707 A2 * | 9/2008 | ................ | F01L 9/02 |
| EP | 3406866 A1 | 11/2018 | | |
| EP | 3656990 A1 | 5/2020 | | |
| JP | S58150296 A | 10/1983 | | |
| JP | S60-73004 A | 4/1985 | | |
| JP | S62253911 A | 11/1987 | | |
| JP | H0726925 A | 1/1995 | | |
| JP | 2009-150296 A | 7/2009 | | |
| WO | 9301399 A1 | 1/1993 | | |
| WO | 0196715 A1 | 12/2001 | | |
| WO | 2006138368 A2 | 12/2006 | | |
| WO | 2007138057 A1 | 12/2007 | | |
| WO | 2014179906 A1 | 11/2014 | | |
| WO | WO-2018215335 A1 * | 11/2018 | ................ | F01L 1/26 |

* cited by examiner

HYDRAULIC DRIVE FOR ACCELERATING AND BRAKING COMPONENTS

This application claims priority from PCT application No. PCT/EP2019/086856 filed Dec. 20, 2019, the disclosure of which are incorporated herein by reference.

TECHNICAL FIELD

The invention relates to a hydraulic drive for accelerating and braking dynamically moving components, particularly valves in gas exchange controls of internal combustion engines and other reciprocating engines, and inventive methods for operating such a hydraulic drive.

PRIOR ART

Variable valve controls on internal combustion engines are known as suitable means for both improving the torque curve via the rotational speed and also for improving the overall efficiency of the engine and for reducing pollutant emissions. The plurality of optimization possibilities is described in the literature. Nowadays, a large number of mechanical, electromechanical, pneumatic, and hydraulic construction options for partially or fully variable valve controls are known, which, however, have only been successful in specific instances due to their large self energy requirements or due to high technical complexity and the associated manufacturing costs. Moreover, many such systems do not provide full variability; for example, opening time and opening duration, or opening duration and opening stroke, may be coupled in a fixed relationship, which may severely limit the possibilities for optimizing the internal combustion engine or other reciprocating engine. Hydraulic systems, in particular, can be built in a space-saving manner due to their high energy density (SAE-1996-0581), are not bound to a cam profile and are thus particularly suitable for variable valve controls on internal combustion engines, if one manages to achieve both a low self energy requirement as well as a low system complexity and a high reliability.

Presently—depending on performance requirements—the following control tasks can be required for a fully variable valve control of an internal combustion engine:

A free, i.e., independent setting of opening and closing time points, i.e. of the so-called control timings, of the inlet and outlet valves, which can also be cylinder-selective if required. For example, the opening duration of the inlet valves allow controlling the quantity of the air or fuel mixture, fast opening and closing of the valves even at low engine rotational speeds, which means low throttle losses during gas exchange, a possibility of control or variation of the opening stroke which is independent from opening duration, for example at the inlet valve so as to generate a desired turbulence in the fresh gas quantity, or for example at the outlet valve so as to increase the engine braking effect, or for example at both valves so as to minimize the consumption of self energy or total energy, an independent and safe closure so as to avoid losses and to avoid damages due to unplanned flowthrough of hot gases, but also to avoid collisions of the gas exchange valves between each other or with the piston, safe maximum stroke limitation in order to avoid collisions of the gas exchange valves with each other or with the piston, electronic controllability with high robustness and low expenditure in terms of sensors and actuators, a gentle touchdown of the valves during the closing process, turning off of individual valves or valve groups, for example, for the purpose of spin generation or cylinder deactivation.

Hydraulic valve drives, particularly for gas exchange valves in the working chamber of an internal combustion engine, have actually been known for a long time, e.g. from German laid-open publication 1,940,177 A. They were used as an alternative to the camshaft-controlled opening of a gas exchange valve, while the closing of the valve was still provided by a spring mechanism. The resetting of the gas exchange valves by means of spring means, usually in the form of helical compression springs, is the most commonly used closing method still today, since it ensures a safe closure. The aim of these systems was to optimize the timing of the gas exchange valve and to achieve a steeper/faster opening and closing of the valves, whereas an optimization of the self energy consumption was usually not explicitly intended. In DE 1,940,177 A, there was no provision of a stroke adjustment, but steps were taken to damp a hard impact against the mechanical stroke limitation and at the touchdown point at the valve seat of the gas exchange valve by displacing the medium through a throttle cross-section.

In WO 93/01399 A1 it is shown that even in systems with a simple, unilaterally acting spring resetting as in DE 1,940,177 A it is possible to minimize the consumption of self energy. Thereby, the kinetic energy of movement which results from the hydraulic drive is temporarily accumulated in compression work of the unilateral, restoring spring accumulator before being used again for the closing movement. Therefore, this principle can also be called an "asymmetric pendulum system". A disadvantage of the proposal of WO 93/01399 A1 is, for example, that each one of the actuation movements of the controlling hydraulic valve occurs amidst the movement phase, namely while the drive piston of the gas exchange valve is moving at high speed and a high-volume flow is flowing through the hydraulic valve. In order to avoid high throttle losses in this situation, the controlling valve must be very fast. Likewise, it must switch precisely and reliably, e.g. at the opening end point of the gas exchange valve movement, so that the kinetic energy can be collected to the full extent and can be retained in the spring. These requirements thus imply very demanding high-speed control valves and a demanding control electronics. Another such asymmetric pendulum system is described in SAE 2007-24-008. The opening stroke can be adjusted independently of the controlling duration via the height of the hydraulic operating pressure. In contrast to WO93/01399 A1, the system dispenses with high-speed switching processes of the hydraulic control valve amidst the movement phase. However, the actuation movement of the control valve in its entirety must also be precisely coordinated with the movement of the gas exchange valve. The flowpath for the opening must close precisely when the gas exchange valve has delivered its kinetic energy to the resetting spring. If the cross-section of the control valve closes too early, the movement of the gas exchange valve is slowed down in a lossy manner, whereas if it closes to late, the gas exchange valve is already being pushed back by the spring and is not held in the desired position, so that it is then slowed down in a lossy manner during the return movement. To achieve the required high-precision, time-accurate motion control of the hydraulic control valve, a precisely defined volumetric flow of a pilot valve is applied to a main slider. For example, the pilot valve is fed by a separate constant pressure system to provide the defined volumetric flow for controlling the main valve. Deviations of the pilot volumetric flow due to wear or clogging of the pilot valve openings, however, have an effect on the speed of the main valve and thus on the quality of the temporal coordination with the drive piston or the gas valve movement.

In the non-previously-published European patent application EP 17172231.7, there is disclosed a hydraulic system for accelerating and braking dynamically moving components, in particular valves in gas exchange controls of internal combustion engines and other components to be driven, in particular a gas exchange valve or a plurality of gas exchange valves which can be actuated jointly via a valve bridge, of an internal combustion engine or other reciprocating engine, a working cylinder comprising a pressure acting surface of a drive piston, at least a first pressure reservoir, for providing a first pressure $p_1$ of a hydraulic pressure medium, at least one restoring energy accumulator with a biasing force $F_{Fv}$, preferably configured as a spring, which engages at the component or at the gas exchange valve, respectively, at least one hydraulic base pressure reservoir, which has a lower pressure $p_0$ than that of the first pressure reservoir, wherein in a first connecting line between the first hydraulic pressure reservoir and the working cylinder there is provided a controllable opening of a first valve comprising at least one, preferably spring-loaded, check valve which is arranged serially in the flowpath upstream, within or downstream, allowing the pressure medium to flow in a direction towards the working cylinder but preventing a backflow in a direction towards the pressure reservoir. Similar systems are also known from DE 100 24 268 A1, WO 2006/138368 A2, DE 10 2004 022 447 A1, WO 2014/179906 A1, JP S58 150296 A, JP 2009 150 296 A and WO 2007/138057 A1.

However, all of these systems mentioned above have the disadvantage that the resulting maximum stroke of the moving mass can deviate significantly from an expected target position. This is particularly true when forces other than the spring force and the intended drive pressure are acting on the mass. Such "other" forces may, for example, be frictional forces or—and this applies in particular to gas exchange valves—pressure and flow forces which may act on the plate surfaces of gas exchange valve.

Ultimately, however, the drive pressure can deviate from the planned value as a result of a failure. A typical example of this situation is found in the outlet valves of internal combustion engines. At the time of opening towards the end of the expansion phase, after combustion has taken place, there is usually still a considerable cylinder pressure, which acts against the opening direction of the valve in the usual plate valve design. In order to be able to open an outlet valve against this cylinder pressure at all, an increased drive pressure or a larger pressure acting surface of the drive piston is required. However, the pressure prevailing in the cylinder is then often reduced after only a short opening distance, while a high driving force is still applied. As a result, the valve overshoots to an undesirably large stroke and, in many cases, to such an extent that it hits a mechanical stop or the spring is forced to block, which can cause noise and damage. The effect is even exacerbated if the valve opening force has been tuned for a high cylinder pressure at the time of opening, but this fails to occur, for example, as a result of a combustion misfire.

Quite apart from safety considerations, it can be advantageous in certain systems to be able to work with a fixed system pressure, i.e. the system pressure does not have to be changed for stroke adjustment or the stroke can be adjusted using another energy-efficient way.

DESCRIPTION OF THE INVENTION

The object of the invention is therefore to provide a hydraulic drive for accelerating and braking dynamically moving components, in which the above-mentioned disadvantages of the prior art, particularly of the non-previously-published European patent application EP 17172231.7, can be overcome. The invention solves this object by means of a hydraulic drive. The features of the invention firstly have the consequence that a reliable operation can be ensured because the drive piston is provided with at least one control edge that corresponds to an inflow opening, which, when a certain stroke has been attained, can prevent an inflow of drive pressure p1 into the drive chamber and thus prevents a low-loss outflow of pressure medium from the braking chamber to the basic pressure level, whereby the remaining hydraulic drive force vanishes, becomes negligible or changes its sign when said stroke (hab) is attained, even if the drive pressure or the disturbance pressure deviates from the planned value as a result of a disturbance. In particular, these features also solve the problems associated with misfirings in internal combustion engines. According to the present invention, the advantageous effect is achieved in particular by the fact that, in this method, the (hydraulic) drive piston itself engages with its path in the hydraulic system. Therefore, the device and the corresponding method are particularly advantageous in internal combustion engines because they are inherently safe and reliable.

It will be clear to the person skilled in the art that the present invention is applicable particularly in gas exchange controls of internal combustion engines and other piston machines. However, it is seen from the elements used that the drive according to the present invention is advantageous in general, i.e. also in other applications in which masses have to be moved in a highly dynamic manner.

The invention can also be used as an independent stroke control system, which can partially supplement or completely replace the known stroke control system by means of the drive pressure level (see SAE 2008-24-008). This means that the pressure in the hydraulic system does not have to be adjusted quickly or even at all. Similarly, the invention can partially supplement, e.g. as a safety device, or even completely replace the known stroke controls which adjust the stroke by closing an inflow control valve in the opening phase (examples WO 93/01399 A1, DE 10 2004 022 447 A1). The special type of stroke control can thus be advantageously applied not only to hydraulic valve drives based on the pendulum principle, but quite generally to hydraulic controls of gas exchange valves.

The insensitivity of the preset gas exchange valve stroke to gas forces acting on the valve plate also allows this drive to be used for engine braking functions. For example, in the compression stroke of an internal combustion engine in unfired braking mode, the outlet valve can be opened a gap, whereby the cylinder charge has to be pushed out against the resistance of the valve and thus the stored energy is dissipated into the exhaust.

Due to the insensitivity to changing gas pressure forces, new applications such as load control of piston gas compressors or piston gas expansion engines (e.g. steam engines, air engines, etc.) can also be implemented.

It can be advantageous if the drive side and—if present—the braking side of the cylinder are connected to the drive pressure reservoir via at least one respective check valve, wherein the check valves open in the direction towards said reservoir but block in the direction towards the cylinder chambers, or are connected to the base pressure reservoir via at least one check valve, wherein the check valves open in the direction towards the cylinder chambers and block in the direction towards the reservoir. It is particularly advantageous for operation if the drive piston stroke at which the cutting process occurs is changeable or adjustable. In this case, the piston control edge can be configured obliquely and the inflow chamber in the cylinder can be configured in a point-shaped manner, so that a twisting between the piston and working cylinder, preferably a twisting of the piston relative to a fixed stationary working cylinder, changes the cutting path. In a clearly advantageous embodiment, the drain control valve is configured as a 2/2-way valve with two additional intermediate positions which are traversed in a time-controlled manner when switching to the open discharge position, wherein the first intermediate position is an open one which initiates the closing movement of the gas exchange valve, and wherein the second intermediate position is a closed one, which when being reached leads to a pressure build-up in the working cylinder for a certain time as a result of the kinetic energy of the moving mass, which allows pressure medium to be pushed back into the drive pressure reservoir, even if the latter is charged to a higher pressure level than the pressure with which the returning spring presses statically on the working piston. This special valve configuration enables the system to recover energy during the reset process even from an unfavorable pressure situation—for example a high-pressure level in the working pressure reservoir due to the high cylinder pressure to be overcome.

Moreover, it can be advantageous if the timing of the drain control valve is achieved by a movement of the drain control valve—which is preferably driven by a spring—causing the pressure medium to flow across a pressure acting surface of the valve through a throttle, so that the intermediate positions of the valve are traversed slowly and/or with a time delay and that bypassing of the throttle by a check valve can be provided in the other actuation direction.

It is possible and in certain cases—for constructional reasons—advantageous to use a rotatable or axially displaceable sleeve with a sloping edge, which is configured in such manner that twisting or axially displacing the sleeve changes the cutting path $h_{ab}$.

The invention allows the use of comparatively slow and correspondingly low-cost control valves. It is also sufficient that the hydraulic control valves only initiates the opening and closing process of a gas exchange valve, since the movement process then takes place automatically without external control interventions. This makes the system easy to handle.

The aforementioned elements as well as those claimed and described in the following exemplary embodiments, to be used according to the invention, are not subject to any particular conditions by way of exclusion in terms of their size, shape, use of material and technical design, with the result that the selection criteria known in the respective field of application can be used without restrictions.

BRIEF DESCRIPTION OF THE DRAWINGS

Further details, advantages, and features of the object of the present invention will become apparent from the following description and the corresponding drawings, in which devices according to the present invention are illustrated by way of example. In these drawings there is shown.

MODES FOR CARRYING OUT THE INVENTION

Figure 1:
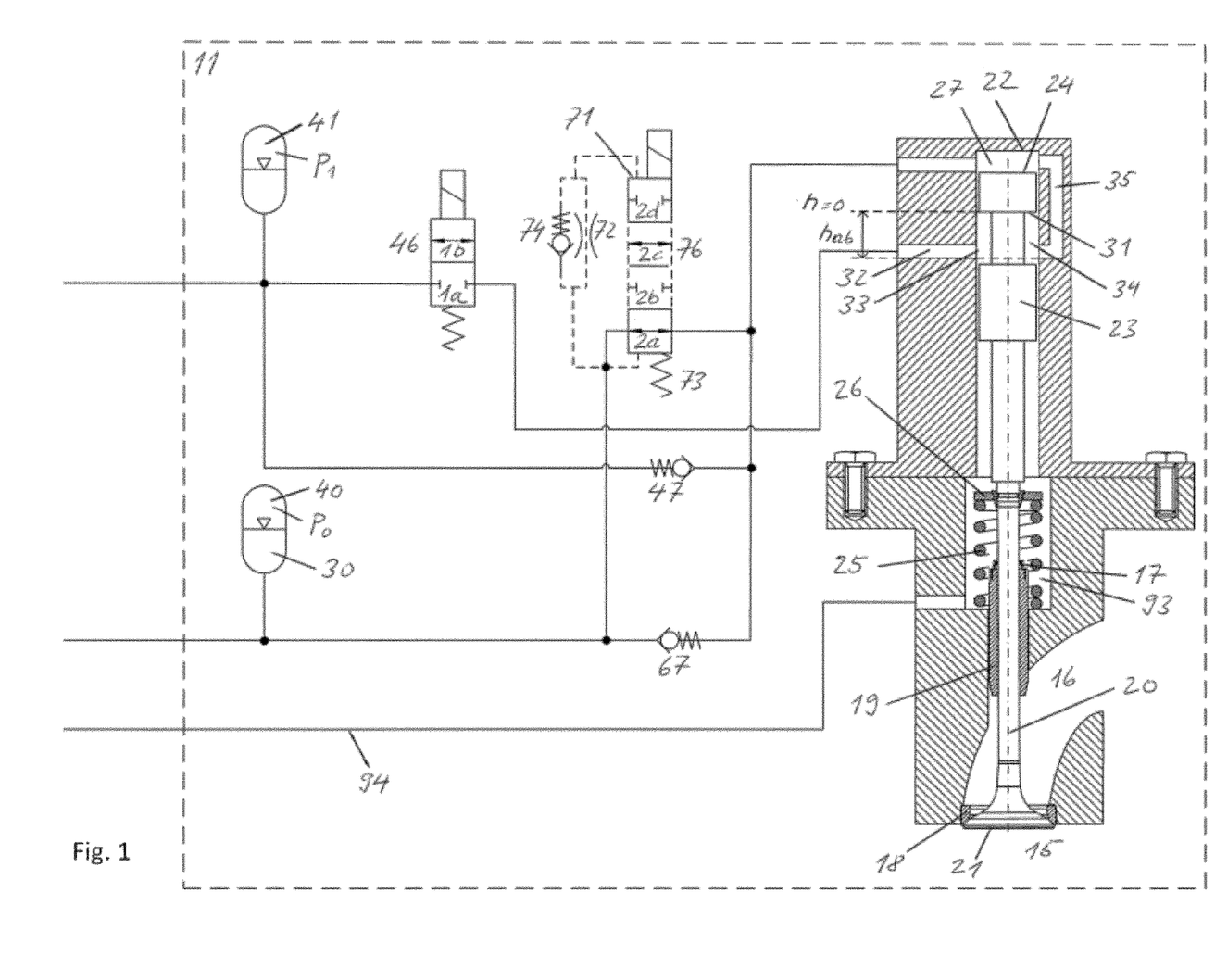
FIG. 1 a first exemplary embodiment of the present invention for stroke limitation by means of inflow cutting with fixed stroke.

In a first exemplary embodiment of the present invention—as shown in FIG. 1—a gas exchange valve 20 for an engine is operated both for opening and also for closing by means of a hydraulic drive comprising a working cylinder 22 and a drive piston 23 as well as a spring 25 acting against the force movement of the drive piston. For better understanding, the hydraulic drive can be divided into a core part, including one or more gas exchange valves 11 and into a supply unit. In the supply unit, not shown here, the provision of pressure for the proposed pressure reservoirs (40, 41) occurs in an inherently known manner, preferably with controllable pumps, which allow the transported flow to be adapted to the volume flow and pressure requirement. The pressure is regulated with the usual means of hydraulics and, for example, also by means of pressure sensors and electronics. The control electronics also takes over the electrical control of the electrically switchable control valves 46, 76. For the sake of simplicity, the electronics and connecting lines are also not shown.

In this exemplary embodiment, the control valves 46 and 76 are configured as directly controlled, magnet-operated way valves. In the exemplary embodiment, a slightly raised base pressure $p_0$ was chosen compared to the tank pressure, in order to keep the system largely free of gas bubbles that could impair the function. In this example, leakage accumulating in the spring space 93 are fed via a leak collecting line 94 to a central tank with pressure. Provided that the valve shaft seal 17 is sufficient for this purpose, the leakage line can also be connected to the slightly higher basic pressure level $p_0$. Likewise, an embodiment of the base pressure reservoir 40 as a normal, ambient-ventilated tank is also possible in principle. In all cases where the two pressures are equal, there is, under certain conditions, no pressing force of the drive piston to the shaft end of the gas exchange valve. In such cases, the drive piston and valve shaft would be provided with a mechanical cooling, or the drive piston would be equipped with a weak pressing spring that presses the drive piston against the end of the valve stem. In this way, there is an inherent valve lash compensation.

Figure 4:
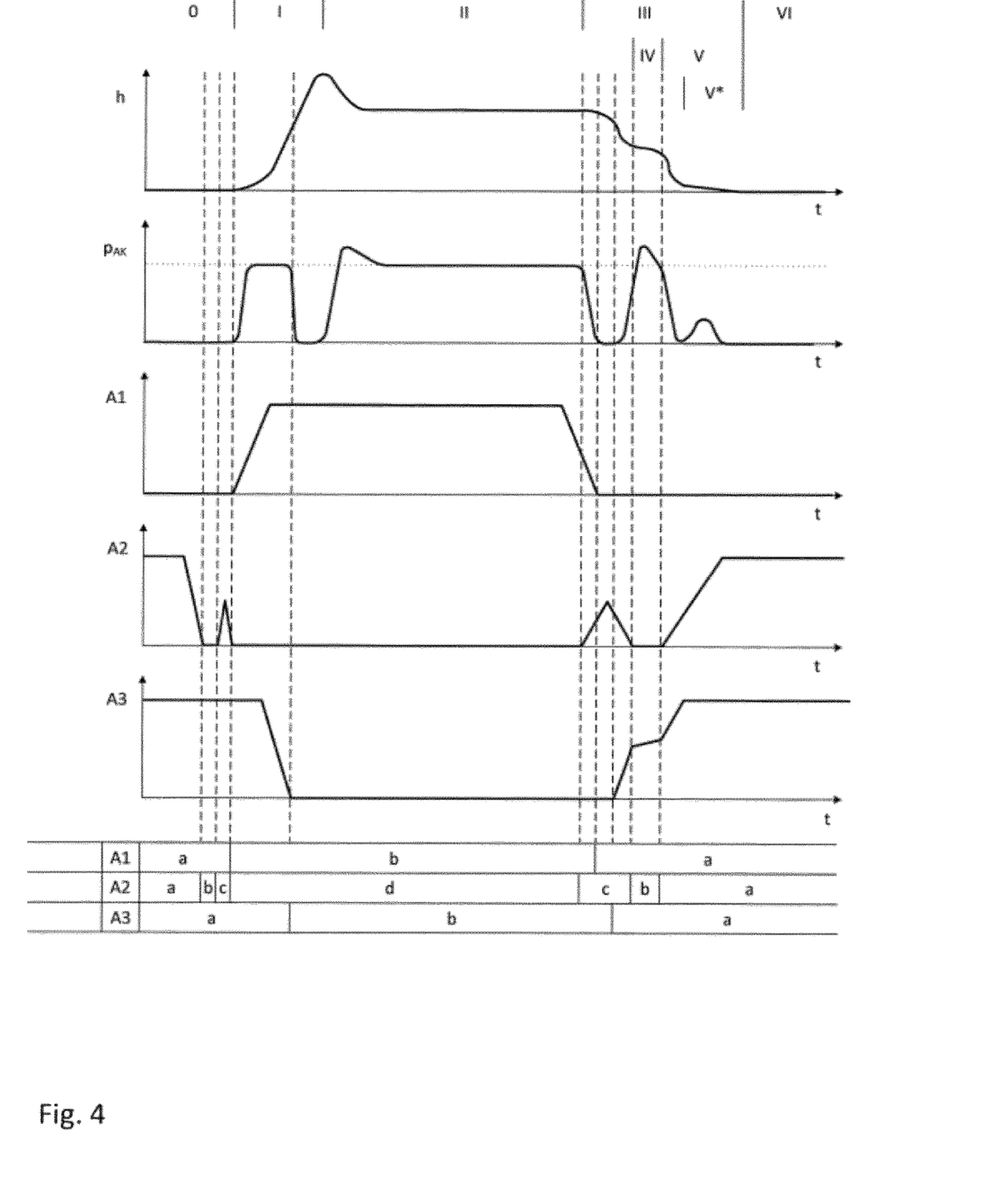
FIG. 4 timing diagrams.

The phases of the movement sequence, the occurring pressure $p_{AK}$ in the driving chamber and the associated valve and control edge openings are shown in FIG. 4. In the resting state—phase 0, gas exchange valve closed—the inflow control valve 46 is closed (position 1a) and the drain control valve 76 is opened (position 2a), whereby the driving chamber of the single-acting working cylinder 22, in which the drive piston 23 with pressure acting surface 24 of the area content A is movably arranged, is connected to the base pressure reservoir 40 at the pressure level $p_0$. The biasing force $F_{F_v}$ of the spring 25 in the resting state (drive or gas exchange valve stroke h=0) is selected such that—against the opening force from the product $p_0 \times A$, but also against other opening forces e.g. on the plate 21 of the gas exchange valve 20 engaging from underpressure in the engine cylinder 15, or overpressure in the gas exchange channel 16—the gas exchange valve remains securely in the closed rest position or can reliably move back to there, even with expected frictional forces, such as e.g. from valve shaft seal 17 or valve guide 19. It should be noted here that the mentioned engaging forces vary depending on the operating point and application type of the internal combustion engine or reciprocating engine, inlet or outlet valve, and they can also change their direction. A short time before the planned opening of the gas exchange valve 20, the relief drain control valve 76 is closed (position 2d). For opening (phase I), the inflow control valve 46 is then opened (position 1b). As a consequence, the pressure $p_1$ from the drive pressure reservoir 41 is applied to the pressure acting surface 24 of the drive piston 23. The flow path from the inflow control valve into the driving chamber is implemented by the connection which is open in this position via channel 32, piston ring chamber 34 and overflow channel 35.

Provided that no other forces act on the gas exchange valve 20 than the biasing force $F_{Fv}$ of the spring 25 and the hydraulic force on the drive surface, the gas exchange valve will open when the pressure force applied in the driving chamber 27 exceeds the biasing force $F_{Fv}$ of the spring 25. It is clear that the actual force at which opening takes place may vary according to the additional forces mentioned. In particular, if high counteracting forces are expected, for example by acting on the valve plate surface 21 from the side of the engine cylinder 15, the pressure $p_1$ will be set high enough to ensure reliable opening.

In the exemplary embodiment, the spring 25 which is used as an energy accumulator, is configured with a high spring constant c, so that a rapid movement of the mass is achieved. The time for full opening corresponds approximately to the half period $T_{1/2}$ of an oscillation of the mass-spring oscillator, which is formed by the spring constant c and the effective mass m, namely by the mass of the gas exchange valve 20, spring plate including fastening means 26, drive piston 23, and optionally valve bridge, a mass portion of spring 25 and of the co-swinging pressure medium 30:

$$T_{1/2} = \pi \cdot \text{square root } (m/c) \qquad \text{(equation 1)}.$$

In EP 17172231.7 it was derived that for an asymmetric hydraulic pendulum system, in which calculations are made without additional forces, the occurring maximum stroke of the gas exchange valve is given by the equation:

$$h_{max}(p_1) = 2 \cdot (p_1 \cdot A - F_{Fv})/c \qquad \text{(equation 2)}$$

From this equation it can be seen that in this case the maximum stroke increases proportionally to the drive pressure $p_1$.

If, in order to overcome difficult conditions during opening, the pressure $p_1$ in such a system has to be set to a comparatively very high value, in particular higher than would be required to achieve the maximum desired or permissible stroke, it is immediately apparent that the maximum gas exchange stroke can become very large and lead to damage, especially if the high counterforce breaks down during the movement of the gas exchange valve and or if it unexpectedly does not occur at all. Both are typical situations as they can occur on the outlet valves of internal combustion engines: the considerable pressure from the engine cylinder acting on the valve plate surface 21 is typically 5-10 bar and then often drops sharply after a short time, so that a considerable excess of acceleration force is suddenly available at the drive piston, or the expected cylinder pressure does not occur at all due to a combustion misfire and the acceleration occurs already from the start with the extra high pressure $p_1$ being set.

Hydraulic drive systems, which are not referred to as "pendulum systems" in the sense of the present document, are typically characterized by a lower spring constant c. Since this would result in very large strokes, the pressure in such systems is not primarily used to set the stroke, but the acceleration process is typically ended by closing the inflow control valve to the drive chamber. However, the problem with the influence of the gas forces exists in the same way with these systems.

The accelerated gas exchange valve or the accelerated mass now continues to move until a control edge 31 «cuts» the hydraulic connection 32, 35 between the inflow control valve 46 and the driving chamber 27 of the working cylinder 22. In the example, this is implemented in such a manner that the inflow enters the working cylinder through a channel 32, preferably a bore, with an opening 33, where the working piston has an annular space 34, which is bounded on one side by the control edge 31. A channel 35 leads therefrom into the driving chamber 27. The hydraulic connection is cut when the control edge closes the opening 33 at $h = h_{ab}$.

The working piston thus assumes the function of a third control valve. Due to the fact that this is stroke-controlled by the gas exchange valve, the control intervention takes place more or less passively or automatically. This is therefore a very safe stroke limitation method compared to hydraulic controls, which require active control intervention at this point.

It is, of course, also possible not to attach the control edge directly to the piston, but to configure the shaft of the gas exchange valve accordingly. It would also be possible to configure the function of the third control valve in a separate valve, which is stroke-controlled by the moving components.

After the control edge 31 has closed the opening 33, the gas exchange valve continues to move due to its kinetic energy. Since the inflow from the drive pressure reservoir to the driving chamber of the cylinder is now cut, the pressure medium can now flow in from the basic pressure reservoir via the check valve 67.

Due to the restoring force of the spring 25, which continues to increase with the stroke, and due to the considerably reduced drive force caused by the inflow cutting, the gas exchange valve continues to move until the kinetic energy is completely transferred to the spring energy store.

When the gas exchange valve has completed its opening movement, the check valve 67 closes automatically. Particularly in case of a large pressure $p_1$ it may happen that the spring is tensioned to such an extent that in this stroke position it is able to generate a pressure $p_{AK}$ with the working piston surface 24 of size A in the driving chamber 27 that is greater than the pressure level $p_1$ in the working pressure reservoir. In this case, also shown in FIG. 4, the spring with the drive piston pushes the pressure medium through the check valve 47 back into the working accumulator until pressure equilibrium prevails. The associated reduction in stroke is usually easily coped with in the gas exchange of internal combustion engines. For example, a large initial stroke is advantageous, in particular, for the outlet valve, while the later stroke profile is less important. In addition, the stroke reduction is accompanied by energy recovery, because the pushed back pressure medium can be used again later. The gas exchange valve then remains in the swung back position. However, the stroke reduction described does not always take place. Conditions can also occur in which the spring does not have the power to push pressure medium into the working pressure reservoir. This can be the case, for example, if the pressure p1 has been set to a comparatively high value for the purpose of opening the gas exchange valve. In any case, the working piston and thus the gas exchange valve remain in the position reached (phase III) until the closing process IV is initiated by resetting the valve 76.

Valve 76 has the peculiarity that it switches back at an approximately constant speed. This is achieved in that the spring 73 has to push pressure medium through the throttle 72 via the control surface 71, whereas in the other actuation direction a bypass of the throttle can be provided by a check valve 74. A spring is ideal for this process due to its consistency. An alternative embodiment variant would be, for example, an accordingly configured rotary slide valve. As shown in EP 17172231.7, the reset time is adjusted to approximately half the period $T_{1/2}$ of the spring-mass system, here in particular until position 2b is reached. In contrast to EP 17172231.7, pressure medium is first released from the driving chamber (position 2c) in order to bring the gas exchange valve into closing acceleration at all.

As explained above, the spring has a maximum pressure $p_1$ in the working chamber during the holding phase. Since it would continue to lose power during further closing due to its spring characteristics, it is therefore not able to push out any more pressure medium by itself. By means of the intermediate position 2c, the gas exchange valve is thus able to first build up kinetic energy, which it can then release again at the higher-pressure level $p_1$ after the end of the pendulum process. For this purpose, the throttle of the drain valve slide is dimensioned in such manner that the drain control valve reaches its closed position 2b after approximately half the period of this oscillation. As a result of the associated braking of the gas exchange valve, a pressure builds up in the driving chamber 27, which, as long as it is greater than $p_1$, is pushed back via check valve 47 into the drive pressure reservoir. The drain control valve then moves further into its resting position, the open position 2a, in order to initiate the complete closing of the gas exchange valve.

FIG. 4 shows how the valve positions are advantageously coordinated with the movement of the gas exchange valve and the pressure in the drive working chamber. The soft braking of the gas exchange valve before it hits the valve seat 18, as shown in FIG. 4, is explained below with reference to the second exemplary embodiment. It should also be mentioned here that for the first exemplary embodiment the inflow control valve 46 can also be closed much earlier than shown in FIG. 4 because the inflow and the drain control valve are not coupled here. In principle, the earliest closing time can already occur after the cutting stroke $h_{ab}$ has been traversed by the drive piston or gas exchange valve. The lack of need for a precise closing timing of the inflow control valve 46 allows it to be of simple construction, and the expense of electronic actuation is substantially reduced. The inflow control valve 46 may also switch comparatively slowly, which means that in many cases costly construction using, for example, eddy current inhibiting special solenoid materials can be dispensed with.

Figure 2:
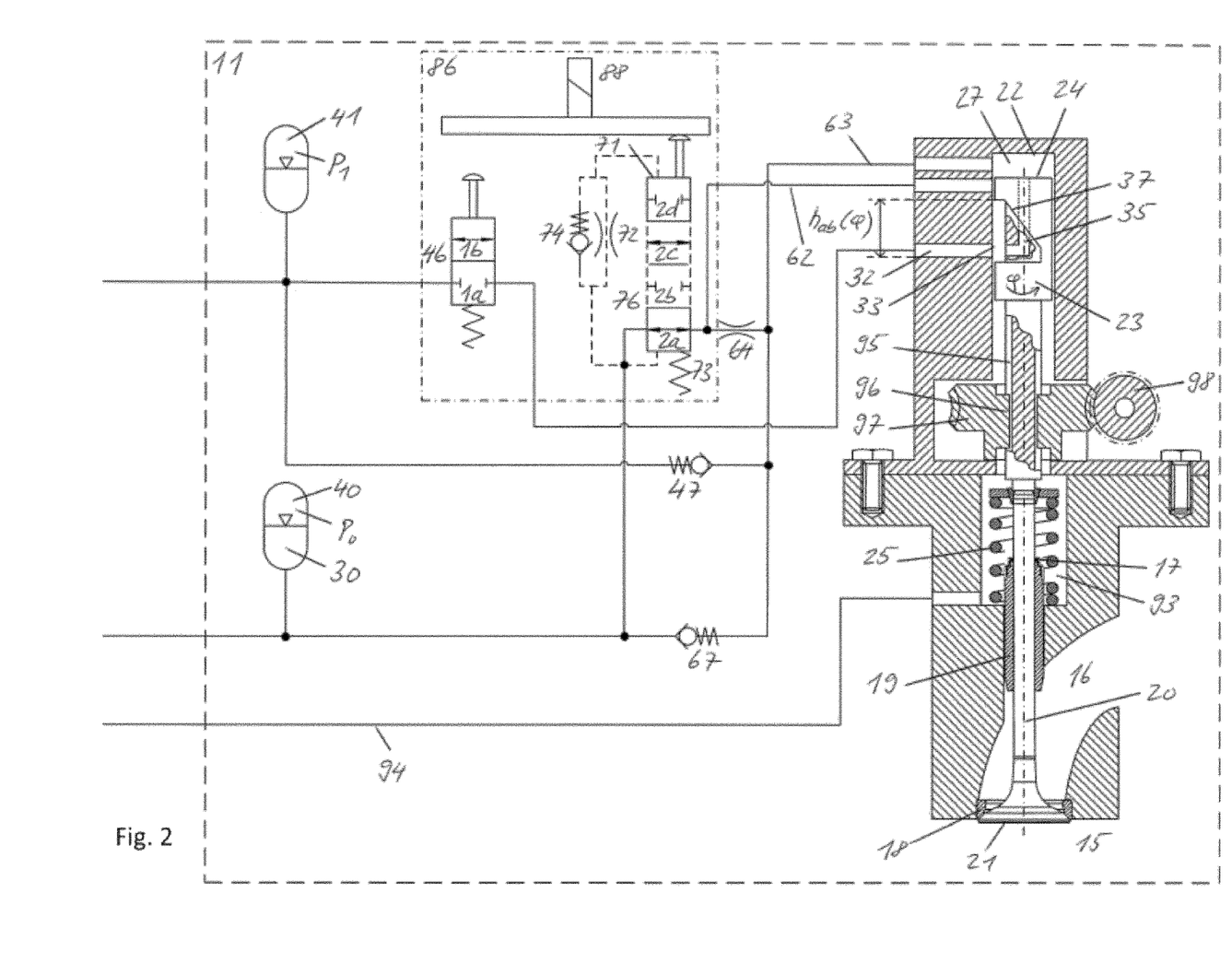
FIG. 2 a second exemplary embodiment of the present invention for stroke adjustment by means of inflow cutting with adjustable stroke and a combined control valve.

The second exemplary embodiment according to FIG. 2 differs from the first one, on the one hand, essentially only by the adjustability of the cutting stroke $h_{ab}$ by means of twisting of the drive piston 23 and, on the other hand, by a mechanical coupling of valves 46 and 76 to form a combined valve 86, by means of which it is possible to operate with only one electrical actuator 88. The coupling can be implemented similarly as described in EP 17172231.7.

The cutting stroke $h_{ab}$ is adjusted here by means of a sloping control edge 37 on the drive piston against a substantially point-shaped opening 33 of the inflow channel 32, preferably a bore, and can thus be varied via the angle of rotation cp. The overflow channel 35 has been relocated into the piston.

Figure 7:
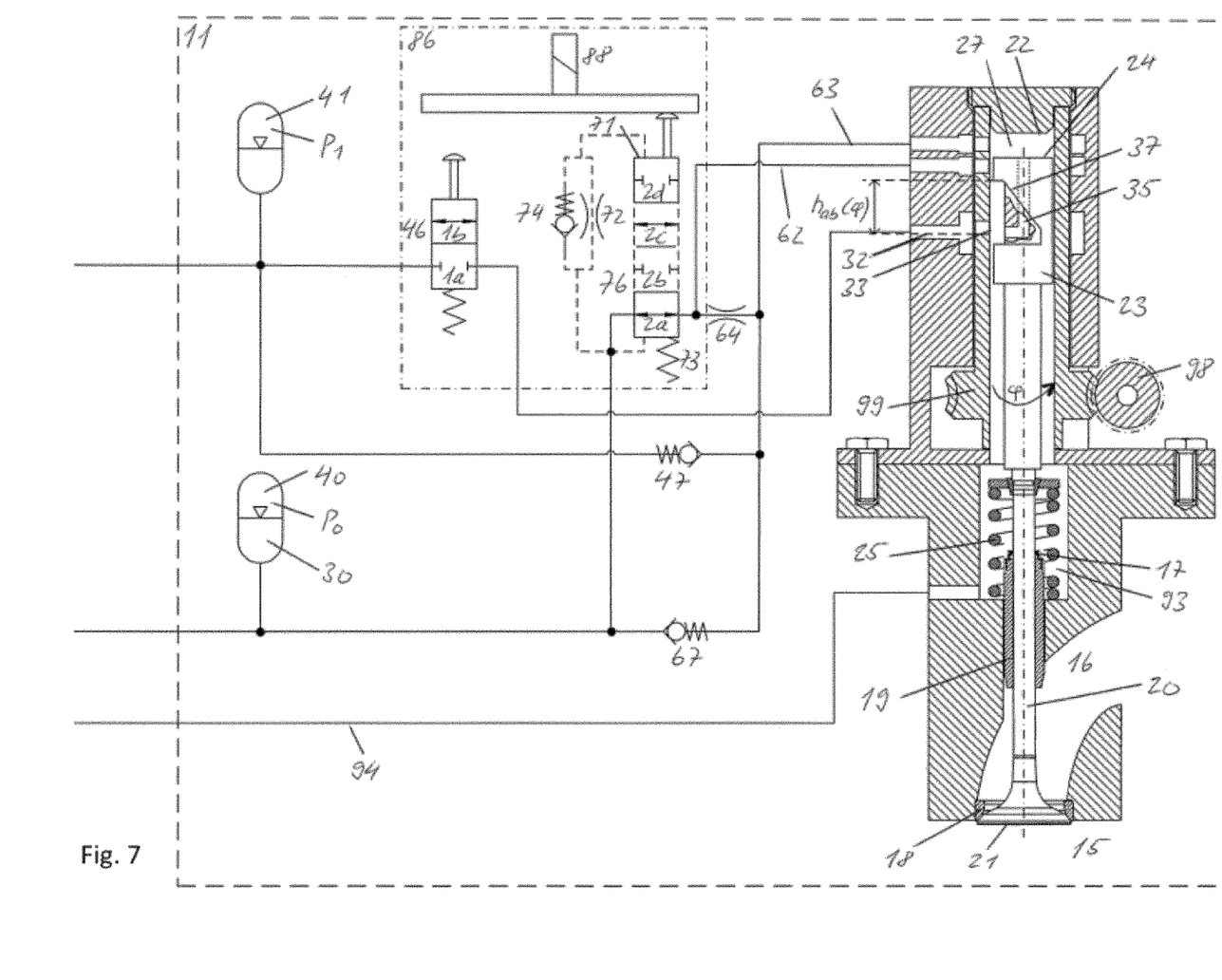
FIG. 7 a fourth exemplary embodiment of the present invention for stroke adjustment by means of inflow cutting with adjustable stroke by twisting a bush and non-rotatable drive piston.

It should be mentioned that the corresponding edges of the piston and working cylinder may also be interchanged, so that the sloping edge in the cylinder and the preferably round counter surface is arranged in the piston. FIG. 7 shows an exemplary embodiment in which the drive piston is not rotatable, but the sleeve in which the drive piston runs, is rotatably configured. In this exemplary embodiment, the sloping edge is arranged on the drive piston, and the preferably round counter surface is arranged in the running sleeve. It is clear to a person skilled in the art that the corresponding edges of the drive piston and running sleeve may also be interchanged. A particularly clear solution that does not require a sloping edge can also be achieved by means of an axially displaceable sleeve in which the piston runs. The drive piston is equipped with longitudinal grooves 95 in which an axially non-movable gearwheel 97 engages with lugs 96, which can be adjusted, for example, by a self-arresting drive worm 98. In this way, the drive piston 23 may be twisted without being influenced in its longitudinal movement. The stroke adjustment can be used very well to reduce the energy requirement of the hydraulic drive, since small gas exchange valve strokes are sufficient for low-loss gas exchange on the combustion engine at low speeds. The hydraulic energy requirement usually decreases proportionally or disproportionately with the gas exchange valve stroke, because at least the necessary amount of pressure medium decreases with the stroke.

For reasons of noise and wear, a particularly gentle touchdown of the gas exchange valves onto the valve seats is often desirable. For this purpose, the exemplary embodiment according to FIG. 2 is equipped with a path-controlled braking device which, as can be seen in FIG. 4, generates a short peak of the pressure $p_{AK}$ in the driving chamber 27. This is achieved—similar to EP 17172231.7—, in that the drive piston closes the channel 62 as it approaches its rest position and the pressure medium thus being pressed through the channel 63 through the throttle 64. If $p_{AK}$ thereby assumes a value higher than $p_1$, the pressure medium is also pushed back through the check valve into the drive pressure reservoir 41.

Figure 3:
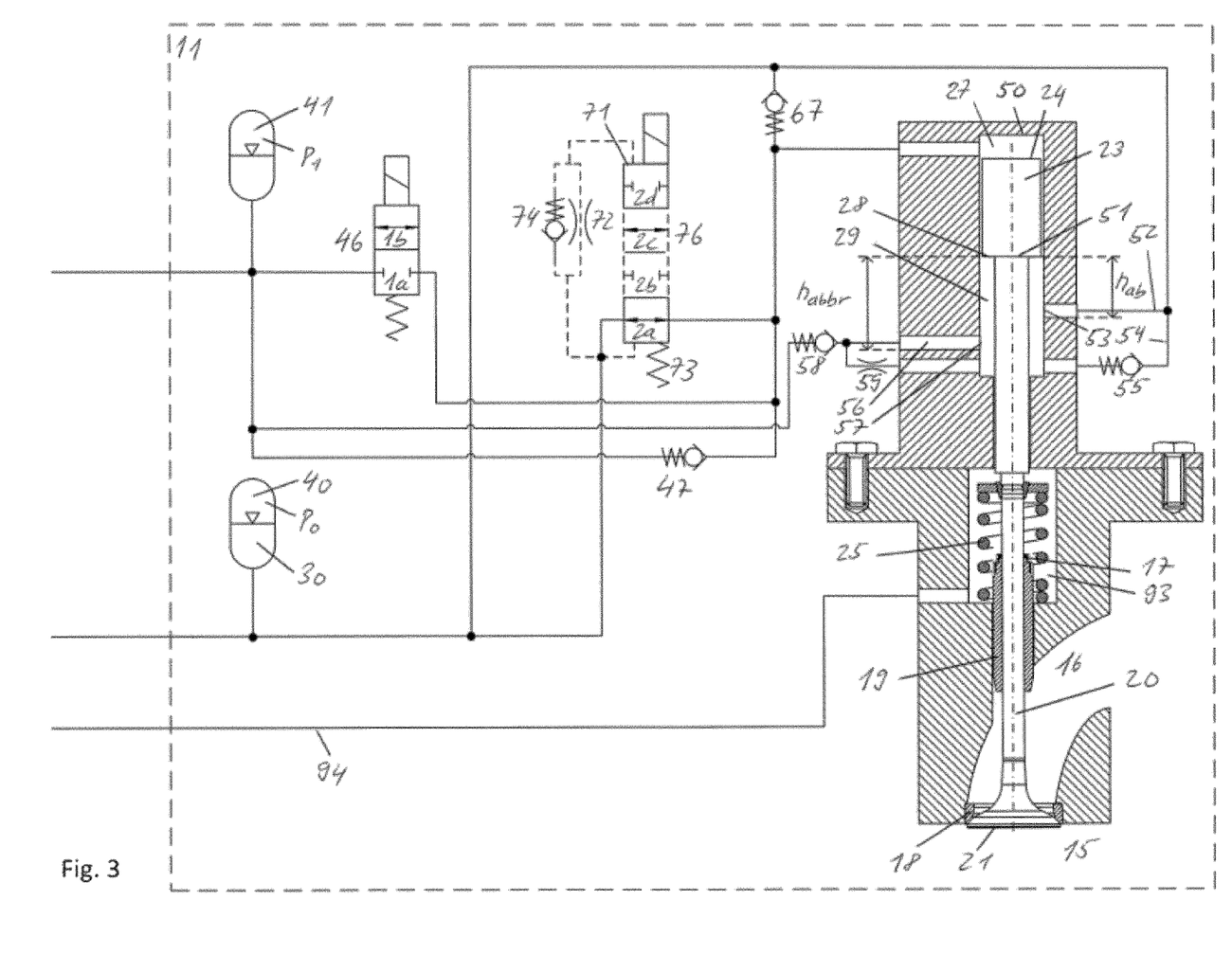
FIG. 3 a valve assembly for a third exemplary embodiment comprising a double-acting cylinder and outflow cutting in the brake chamber.

FIG. 3 shows an exemplary embodiment in which the braking side of a double-acting working cylinder 50 is used for stroke limitation. Here, the working cylinder has a brake chamber 29 in addition to the drive chamber 27. In this exemplary embodiment, instead of cutting the drive chamber 27 from the drive pressure inflow, the brake chamber 29 is cut off from the outflow into the base pressure reservoir 40 and a brake force opposing the motion is generated. Thus, as in FIGS. 1 and 2, but in a different way, the net drive force is markedly reduced from a cut-off stroke $h_{ab}$. Of course, it would also be possible to use both methods in parallel. If the brake pressure exceeds the pressure level $p_1$ of the working pressure reservoir 41, pressure medium is pushed back into the working pressure reservoir via the check valve 58.

Induction of the movement of the gas exchange valve 20 is initially carried out in a known manner. The brake chamber 29 is connected to the base pressure reservoir 40 via a connecting channel 52 and an inflow channel 54. During the movement, pressure medium is pushed out through the connecting channel 52 to the base pressure reservoir. This continues until the outflow control edge 51 closes the opening 53 of the connecting channel in the cylinder wall.

Thereby a brake pressure is built up in the brake chamber. If the kinetic energy of the moving components is sufficient, the brake pressure exceeds the pressure $p_1$ and pressure medium is fed back into the drive pressure reservoir 41 via the refeed channel 56 and check valve 58. The brake energy can be reused in this way. If this braking is not sufficient and if the outflow control edge 51 also closes the opening 57 of the refeed channel 56 in the cylinder wall at $h_{abbr}$, then an even higher braking pressure builds up in the brake chamber. This high brake energy can be reduced, for example, via an additional throttle 59 upstream of the check valve 58, so that some of the energy can still flow into the drive pressure reservoir 41. The braking effect is always supported by the restoring effect of the spring 25. It should be mentioned that if the spring is weak, the closingly acting surface 28 of the drive piston may also be configured larger than the openingly acting surface 24 in order to achieve a greater brake effect. If the drive piston has been braked, it is held, in this exemplary embodiment, in position by a check valve 58 in the inflow line. The closing process is initiated by pressure reduction in the driving chamber 27 and may be controlled by valve 76 as described in FIG. 1. To prevent developing of a vacuum in the brake chamber 29 at the beginning of the closing process, the check valve 55 is provided in the inflow channel 54.

Figure 5:
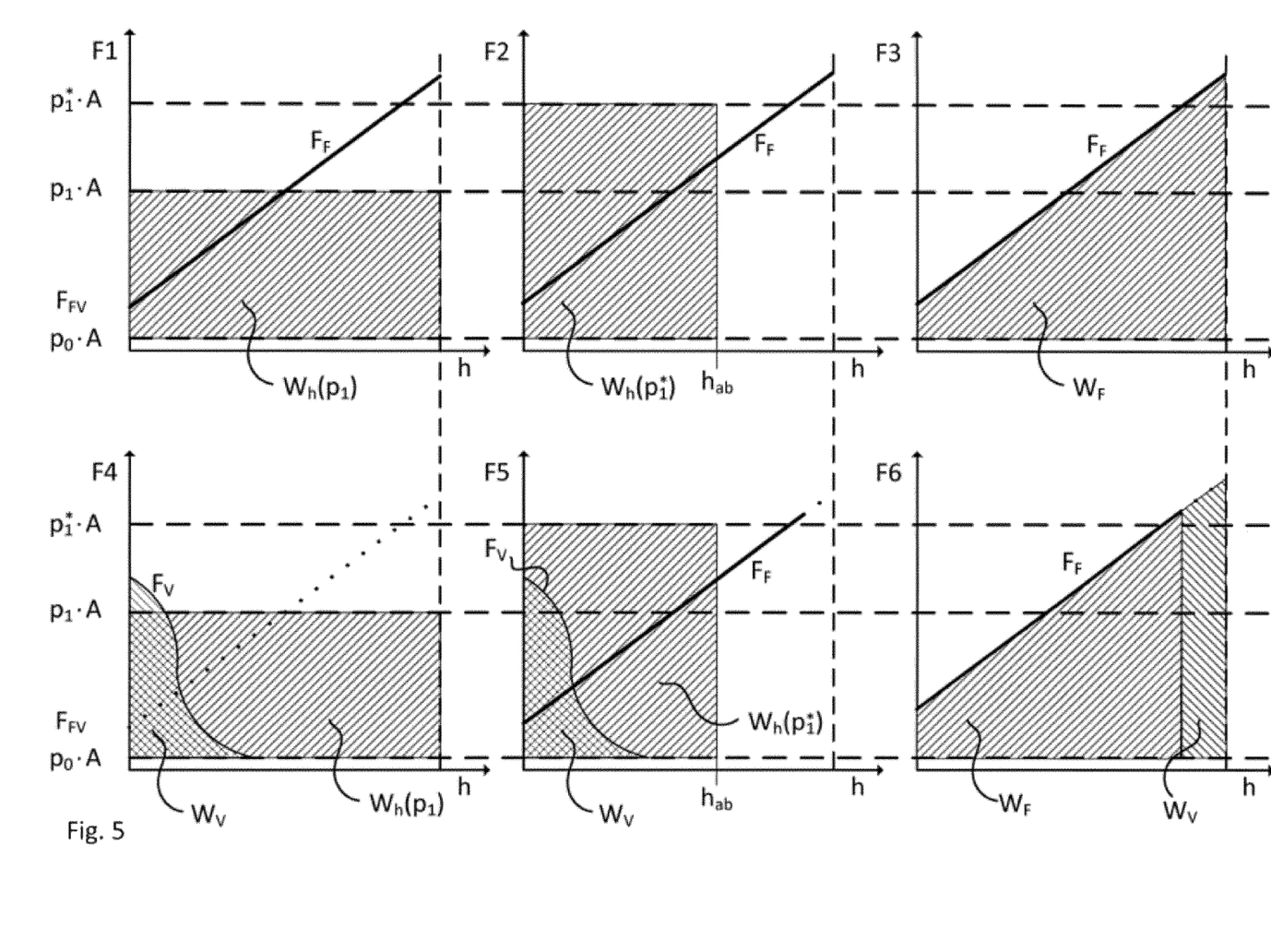
FIG. 5 force-displacement diagrams.

FIG. 5 shows how the process according to the invention works and how it copes with disturbing forces by means of idealized friction-free force-displacement diagrams. Shown in each case are the hydraulic drive force p·A, the stroke-dependent spring force $F_F$ and, as areas, the associated hydraulic work $W_h$ and the spring force $W_F$. Diagram F1 represents an asymmetric pendulum system, in which—related to the drive pressure $p_1$—the maximum stroke $h_{max}(p_1)$ is adjusted to twice the stroke compared to the theoretical equilibrium point with stroke $h_{stat}$ (as applied in EP 17172231.7). F2 shows by way of example the application of the inflow cutting method according to the present invention, with which the amount of supplied energy is limited. Even with increased pressure $p_1^* > p_1$ the amount of supplied hydraulic energy may be set the same as in F1 by adjusting the cutting stroke $h_{ab}$ so that the same maximum stroke (and thus the same energy $W_F$ of the spring energy accumulator) can be achieved as shown in F3. In diagrams F4, F5 and F6, a disturbance force $F_V$ of a gas exchange valve or the associated loss work surface $W_V$, which counteract the direction of valve movement are added, which have an inherently negative magnitude. In the case of $p_1 \cdot A$ in diagram F4, the valve does not switch at all since the hydraulic force does not reach the required opening force; $p_1^* \cdot A$ works thanks to inflow cutting. Only the stroke becomes a little smaller according to the loss of work surface $W_V$. Without cutting, however, the gas exchange valve would overshoot by far.

Figure 6:
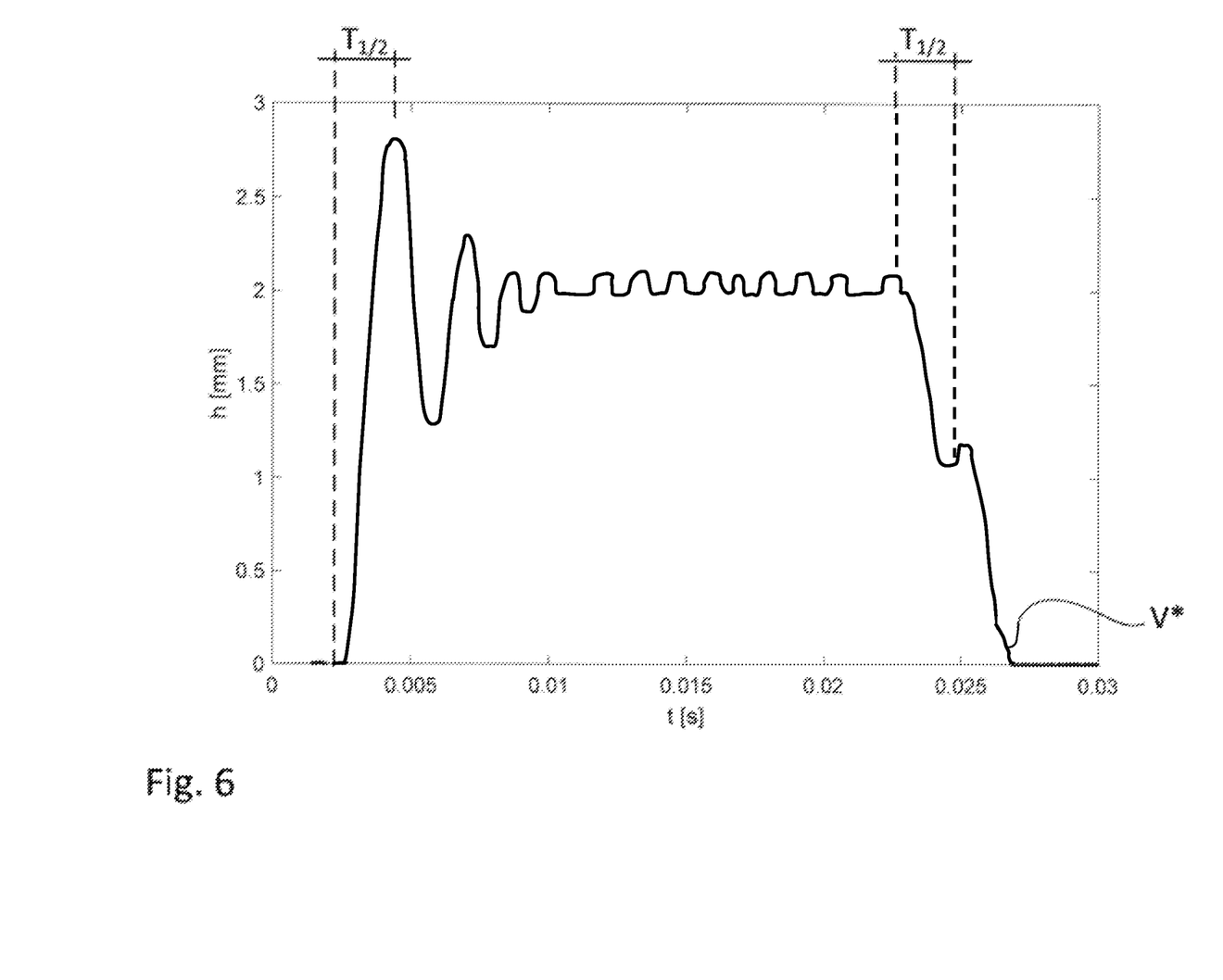
FIG. 6 measured stroke profile of a gas exchange drive similar to exemplary embodiment 2.

FIG. 6 shows the measured valve stroke profile of a drive implemented according to the exemplary embodiment 2 on a fired internal combustion engine. The figure shows that the opening time and the closing time (until the kinetic energy has been consumed) represent the same time constant $T_{1/2}$. The hump approximately in the middle of the closing process represents the end of the closing oscillation process, which is accompanied by the energy gain from the kinetic energy. The recognizable oscillations, particularly after the opening process, are superimposed onto the regular process shown in FIG. 4. They are of little importance for the overall function. A general moving backwards of the gas exchange valve directly after opening, before a stable stroke is assumed, is less pronounced at a small stroke, as shown in FIG. 4. On the last tenths of a millimeter before the touchdown point, the onset of the soft touchdown brake can be recognized.

LIST OF REFERENCE NUMERALS

- 11 core part of the drive including one or more gas exchange valves
- 15 engine cylinder
- 16 gas exchange channel
- 17 valve shaft seal
- 18 valve seat
- 19 valve guide
- 20 gas exchange valve
- 21 plate of the gas exchange valve
- 22 working cylinder
- 23 drive piston
- 24 openingly acting pressure acting surface of the drive piston
- 25 spring
- 26 spring plate including fastening means
- 27 driving chamber
- 28 closingly acting pressure acting surface of the drive piston
- 29 brake chamber
- 30 pressure medium
- 31 inflow control edge of the drive piston
- 32 inflow channel
- 33 control edge of the inflow channel in the cylinder wall
- 34 overflow space in the piston
- 35 overflow space in the working cylinder or in the drive piston
- 37 slant inflow control edge of the drive piston
- 40 base pressure reservoir with pressure level $p_0$
- 41 drive pressure reservoir with pressure level $p_1$
- 46 inflow control valve
- 47 refeed-back check valve of the working chamber 27 of the working cylinder
- 50 double-acting working cylinder
- 51 outflow control edge of the drive piston
- 52 connecting channel to base pressure level
- 53 opening of connecting channel in cylinder wall
- 54 inflow channel of base pressure level
- 55 check valve in the inflow channel from the base pressure level
- 56 refeed channel to the drive pressure reservoir
- 57 opening of the refeed channel in the cylinder wall
- 58 refeed check valve of brake chamber 29 of working cylinder
- 59 throttle
- 62 first inlet and outlet channel
- 63 second inlet and outlet channel
- 64 soft-charging throttle
- 67 check valve between drive chamber and base pressure reservoir
- 71 pressure acting area of drain control valve 76
- 72 throttle of the drain control valve 76
- 73 spring for returning drain control valve 76
- 74 check valve of drain control valve 76
- 76 drain control valve
- 86 combined valve
- 88 common actuator
- 93 spring space 94 leak collection line
95 longitudinal groove
96 gearwheel noses
97 gearwheel
98 drive worm
99 rotatable sleeve with gear
A area content of the pressure acting surface 24 of the drive piston 23
$p_0$ pressure of base pressure reservoir 40
$p_1$ pressure of drive pressure reservoir 41
$p_T$ tank pressure—all pressures shall be understood relative to ambient pressure
$p_{AK}$ pressure in the drive chamber
h stroke of gas exchange valve 20 or of drive piston 23, respectively
$h_{ab}$ cutting stroke
$h_{abbr}$ brake stroke
$h_{max}$ maximum opening stroke
$h_{stat}$ theoretical static opening stroke
m effective mass of moved component
=sum of the masses of: gas exchange valve comprising spring plate and, optionally, valve bridge etc., mass of drive piston 23, mass fraction of spring 25.
mass fraction of entrained pressure medium 30, further entrained parts such as valve bridge, etc.
$F_F$ spring force of spring 25, dependent on spring compression
$F_{Fv}$ pretensioning force of spring 25 in the closed position of the gas exchange valve, h=0
$F_V$ force at gas exchange valve
$W_F$ spring work
$W_h$ hydraulic work
$W_V$ loss work
c spring constant of spring 25 (for a linear characteristic)
t time
$T_{1/2}$ half period duration of the spring mass oscillator from m and c
1a, 1b switching positions of valve 46
2a, 2b, 2c, 2d switching positions of valve 76
φ rotation angle between drive piston 23 and inflow opening 33
Phases:
O resting phase
I opening of gas exchange valve
II first holding phase in the open state
III closing of gas exchange valve
IV second holding phase before valve seat
V final closing of gas exchange valve
V* soft landing phase
VI resting phase
Cross-Sectional Profile
$A_1$ cross-sectional profile at the inflow control valve 46
$A_2$ cross-sectional course at the outflow control valve 76
$A_3$ cross-sectional profile of the inflow cutting opening 33
a open
b closed
Force-Displacement Diagrams
F1 only $p_1$ with stroke adjustment via pressure
F2 only $p_1^* < p_1$ with inflow cutting
F3 spring characteristic and spring work for case F1 and F2
F4 case with loss work FV, $p_1 \rightarrow$ does not work
F5 case with loss work FV, $p_1^* > p_1$ with inflow cutting
F6 spring characteristic and spring work for case F5

The invention claimed is:

1. A hydraulic drive for accelerating and braking dynamically moving components of an internal combustion engine, the hydraulic drive comprising:
a double-acting working cylinder defining a driving chamber and a braking chamber;
a drive piston configured to slide within the double-acting working cylinder so as to engage at least one gas exchange valve, the drive piston including an opening pressure acting surface in the driving chamber, and a closing pressure acting surface in the braking chamber;
at least one restoring energy accumulator configured to impart a biasing force on the at least one gas exchange valve;
at least one drive pressure reservoir configured to provide a drive pressure of a hydraulic pressure medium at a first pressure;
at least one base pressure reservoir configured to store the hydraulic pressure medium at a base pressure which is less than the first pressure;
at least one inflow control valve configured to selectively connect the at least one drive pressure reservoir to the driving chamber so as to open the at least one gas exchange valve; and
at least one drain control valve configured to selectively connect the driving chamber to the at least one base pressure reservoir,
wherein the drive piston further includes at least one control edge corresponding to an inflow opening of the double-acting working cylinder such that, when a cutting stroke of the drive piston is reached, the at least one control edge (i) prevents an inflow of the drive pressure into the driving chamber, and/or (ii) prevents a low-loss outflow of the hydraulic pressure medium from the braking chamber to the at least one base pressure reservoir,
wherein a remaining hydraulic drive force of the hydraulic pressure medium drops to zero or reverses direction when the cutting stroke is reached, and
wherein the at least one base pressure reservoir is connected to the braking chamber via at least one first check valve which opens in a direction towards the braking chamber, and closes in a direction towards the at least one base pressure reservoir.

2. The hydraulic drive according to claim 1, wherein the driving chamber and the braking chamber are connected to the at least one drive pressure reservoir via at least one second check valve which opens in a direction towards the drive pressure reservoir, and closes in a direction towards the driving chamber and the braking chamber.

3. The hydraulic drive according to claim 1, wherein the at least one drain control valve is configured as a 2/2-way valve with two additional intermediate positions which are traversed in a time-controlled manner when switching to an open discharge position, the two additional intermediate positions including a first intermediate position and a second intermediate position,
wherein the first intermediate position is an open position which initiates a closing movement of the at least one gas exchange valve, and
wherein the second intermediate position is a closed position which leads to a pressure build-up in the double-acting working cylinder for a set period of time which pushes the hydraulic pressure medium back into the at least one drive pressure reservoir.

4. The hydraulic drive according to claim 1, wherein timing of the at least one drain control valve is achieved by a movement of the at least one drain control valve in a first actuation direction which causes the hydraulic pressure medium to flow across a pressure acting surface of the at least one drain control valve through a throttle such that the two additional intermediate positions are traversed at a reduced rate and/or with a time delay, and wherein a drain check valve enables the hydraulic pressure medium to bypass the throttle when the at least one drain control valve moves in a second actuation direction.

5. A method for operating the hydraulic drive according to claim 1, the method comprising:

preventing the inflow of the drive pressure into the driving chamber via the drive piston when the cutting stroke is reached such that the remaining hydraulic drive force of the hydraulic pressure medium drops to zero or reverses direction.

6. A method for operating the hydraulic drive according to claim 1, the method comprising:

preventing the low-loss outflow of the hydraulic pressure medium from the braking chamber to the at least one base pressure reservoir via the drive piston when the cutting stroke is reached such that the remaining hydraulic drive force of the hydraulic pressure medium drops to zero or reverses direction.

7. A method for operating the hydraulic drive according to claim 3, the method comprising:

preventing the inflow of the drive pressure into the driving chamber via the drive piston when the cutting stroke is reached such that the remaining hydraulic drive force of the hydraulic pressure medium drops to zero or reverses direction.

8. A method for operating the hydraulic drive according to claim 3, the method comprising:

preventing the low-loss outflow of the hydraulic pressure medium from the braking chamber to the at least one base pressure reservoir when the cutting stroke is reached such that the remaining hydraulic drive force of the hydraulic pressure medium drops to zero or reverses direction.

9. A method for operating the hydraulic drive according to claim 4, the method comprising:

preventing the inflow of the drive pressure into the driving chamber via the drive piston when the cutting stroke is reached such that the remaining hydraulic drive force of the hydraulic pressure medium drops to zero or reverses direction.

10. A method for operating the hydraulic drive according to claim 4, the method comprising:

preventing the low-loss outflow of the hydraulic pressure medium from the braking chamber to the at least one base pressure reservoir when the cutting stroke is reached such that the remaining hydraulic drive force of the hydraulic pressure medium drops to zero or reverses direction.

11. A hydraulic drive for accelerating and braking dynamically moving components of an internal combustion engine, the hydraulic drive comprising:

a single-acting working cylinder defining a driving chamber;

a drive piston configured to slide within the single-acting working cylinder so as to engage at least one gas exchange valve, the drive piston including an opening pressure acting surface in the driving chamber;

at least one restoring energy accumulator configured to impart a biasing force on the at least one gas exchange valve;

at least one drive pressure reservoir configured to provide a drive pressure of a hydraulic pressure medium at a first pressure, at least one base pressure reservoir configured to store the hydraulic pressure medium at a base pressure which is less than the first pressure;

at least one inflow control valve configured to selectively connect the at least one drive pressure reservoir to the driving chamber so as to open the at least one gas exchange valve; and at least one drain control valve configured to selectively connect the driving chamber to the at least one base pressure reservoir, wherein the drive piston further includes at least one control edge corresponding to an inflow opening of the single-acting working cylinder such that, when a cutting stroke of the drive piston is reached, the at least one control edge prevents an inflow of the drive pressure into the driving chamber, wherein a remaining hydraulic drive force of the hydraulic pressure medium drops to zero or reverses direction when the cutting stroke is reached, wherein the at least one drain control valve is configured as a 2/2-way valve with two additional intermediate positions which are traversed in a time-controlled manner when switching to an open discharge position, the two additional intermediate positions including a first intermediate position and a second intermediate position, wherein the first intermediate position is an open position which initiates a closing movement of the at least one gas exchange valve, and wherein the second intermediate position is a closed position which leads to a pressure build-up in the single-acting working cylinder for a set period of time which pushes the hydraulic pressure medium back into the at least one drive pressure reservoir.

12. The hydraulic drive according to claim 11, wherein the at least one control edge is an inclined surface, and wherein the inflow opening is configured such that the inflow of the drive pressure against the inclined surface causes a twisting of the drive piston relative to the single-acting working cylinder which changes the cutting stroke.

13. The hydraulic drive according to claim 11, wherein the at least one control edge is a sloping edge, and wherein the drive piston is configured to slide within a rotatable sleeve of the single-acting working cylinder such that a rotation of the rotatable sleeve causes a twisting of the sloping edge against the inflow opening which changes the cutting stroke.

14. The hydraulic drive according to claim 11, wherein the drive piston is configured to slide within an axially displaceable sleeve such that axially displacing the sleeve changes the cutting stroke.

15. A method for operating the hydraulic drive according to claim 11, the method comprising:

preventing the inflow of the drive pressure into the driving chamber via the drive piston when the cutting stroke is reached such that the remaining hydraulic drive force of the hydraulic pressure medium drops to zero or reverses direction.

16. A hydraulic drive for accelerating and braking dynamically moving components of an internal combustion engine, the hydraulic drive comprising:

a double-acting working cylinder defining a driving chamber and a braking chamber;

a drive piston configured to slide within the double-acting working cylinder so as to engage at least one gas exchange valve, the drive piston including an opening pressure acting surface in the driving chamber, and a closing pressure acting surface in the braking chamber;

at least one restoring energy accumulator configured to impart a biasing force on the at least one gas exchange valve;

at least one drive pressure reservoir configured to provide a drive pressure of a hydraulic pressure medium at a first pressure;

at least one base pressure reservoir configured to store the hydraulic pressure medium at a base pressure which is less than the first pressure;

at least one inflow control valve configured to selectively connect the at least one drive pressure reservoir to the driving chamber so as to open the at least one gas exchange valve; and at least one drain control valve configured to selectively connect the driving chamber to the at least one base pressure reservoir, wherein the drive piston further includes at least one control edge corresponding to an inflow opening of the double-acting working cylinder such that, when a cutting stroke of the drive piston is reached, the at least one control edge (i) prevents an inflow of the drive pressure into the driving chamber, and/or (ii) prevents a low-loss outflow of the hydraulic pressure medium from the braking chamber to the at least one base pressure reservoir, wherein a remaining hydraulic drive force of the hydraulic pressure medium drops to zero or reverses direction when the cutting stroke is reached, and wherein the at least one drain control valve is configured as a 2/2-way valve with two additional intermediate positions which are traversed in a time-controlled manner when switching to an open discharge position, the two additional intermediate positions including a first intermediate position and a second intermediate position, wherein the first intermediate position is an open position which initiates a closing movement of the at least one gas exchange valve, and wherein the second intermediate position is a closed position which leads to a pressure build-up in the double-acting working cylinder for a set period of time which pushes the hydraulic pressure medium back into the at least one drive pressure reservoir.

17. A method for operating the hydraulic drive according to claim 16, the method comprising:

preventing the inflow of the drive pressure into the driving chamber via the drive piston when the cutting stroke is reached such that the remaining hydraulic drive force of the hydraulic pressure medium drops to zero or reverses direction.

18. The method for operating the hydraulic drive according to claim 17 further comprising preventing the low-loss outflow of the hydraulic pressure medium from the braking chamber to the at least one base pressure reservoir when the cutting stroke is reached.

19. A method for operating the hydraulic drive according to claim 16, the method comprising:

preventing the low-loss outflow of the hydraulic pressure medium from the braking chamber to the at least one base pressure reservoir when the cutting stroke is reached such that the remaining hydraulic drive force of the hydraulic pressure medium drops to zero or reverses direction.

* * * * *